(12) United States Patent
Rathmann

(10) Patent No.: US 9,353,638 B2
(45) Date of Patent: May 31, 2016

(54) WALL STRUCTURE FOR LIMITING A HOT GAS PATH

(75) Inventor: Ulrich Rathmann, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1027 days.

(21) Appl. No.: 12/390,901

(22) Filed: Feb. 23, 2009

(65) Prior Publication Data

US 2009/0155054 A1 Jun. 18, 2009

Related U.S. Application Data

(62) Division of application No. 11/188,404, filed on Jul. 25, 2005, now abandoned.

(30) Foreign Application Priority Data

Jul. 30, 2004 (DE) .................. 10 2004 037 356

(51) Int. Cl.
  *F01D 11/02* (2006.01)
  *F01D 25/12* (2006.01)
  (Continued)

(52) U.S. Cl.
  CPC ............. *F01D 11/005* (2013.01); *F01D 11/02* (2013.01); *F01D 25/12* (2013.01); *F02C 7/12* (2013.01); *F02C 7/28* (2013.01); *F05D 2240/11* (2013.01); *F05D 2240/57* (2013.01)

(58) Field of Classification Search
  CPC ............... F02C 7/12; F02C 7/18; F02C 7/28; F05D 2260/20; F01D 11/005; F01D 11/02; F01D 11/04; F01D 25/12
  USPC ........... 415/115, 116, 135–139, 173.1, 173.3; 277/609, 630, 637, 644, 650, 653, 654; 60/752–760, 799, 800, 805, 806; 431/350–353; 110/336–340
  See application file for complete search history.

(56) References Cited

U.S. PATENT DOCUMENTS 3,752,598 A    8/1973   Bowers et al.
4,650,394 A *   3/1987   Weidner ................. 415/115
(Continued)

FOREIGN PATENT DOCUMENTS

DE     3119056     2/1982
DE     69802848    8/2002
(Continued)

OTHER PUBLICATIONS

Notice of Opposition dated Jan. 31, 2014 filed in the European Patent Office in corresponding European Application No. 05106363.4.

*Primary Examiner* — Andrew Nguyen
(74) *Attorney, Agent, or Firm* — Buchanan Ingersoll & Rooney PC

(57) ABSTRACT

A wall structure for restricting a hot-gas path in a gas turbine or in a combustion chamber including a first wall segment having a first face, and a second wall segment having a second face. Each wall segment disposed adjacent to each other so as to define an inside of the wall segments and an outside of the wall segments. The first and second faces being disposed so as to form a gap leading from the inside to the outside. Each of the faces having a receiving groove. The wall structure further including a sealing element having a thickness and disposed in the receiving grooves so as to bridge the gap. The first face having a recess and the second wall segment having a projection that extends from the second face and protrudes into the recess in the first face. The projection has a tapered cross section.

8 Claims, 2 Drawing Sheets

(51) Int. Cl.
     *F01D 11/00*    (2006.01)
     *F02C 7/12*     (2006.01)
     *F02C 7/28*     (2006.01)

(56)           References Cited

U.S. PATENT DOCUMENTS

| 5,154,577 | A |   | 10/1992 | Kellock et al. |
| 5,374,161 | A | * | 12/1994 | Kelch et al. ............ 415/139 |
| 5,375,973 | A | * | 12/1994 | Sloop et al. ........... 415/173.1 |
| 5,476,363 | A | * | 12/1995 | Freling et al. ......... 415/173.1 |
| 6,270,311 | B1 |  | 8/2001 | Kuwabara et al. |
| 6,702,549 | B2 |  | 3/2004 | Tiemann et al. |
| 2003/0057654 | A1 |  | 3/2003 | Florjancic et al. |
| 2004/0047725 | A1 | * | 3/2004 | Tomita et al. ............ 415/116 |
| 2004/0067131 | A1 |  | 4/2004 | Joslin |

FOREIGN PATENT DOCUMENTS

| EP | 1033477    |    | 9/2000 |
| EP | 1286021    | A1 | 2/2003 |
| EP | 1519010    | A1 | 3/2005 |
| EP | 1519010    | B1 | 6/2006 |
| GB | 2356022    | A  | 9/2001 |

\* cited by examiner

WALL STRUCTURE FOR LIMITING A HOT GAS PATH

CROSS REFERENCE TO PRIOR APPLICATIONS

This application is a divisional of U.S. patent application Ser. No. 11/188,404 filed on Jul. 25, 2005 now abandoned, which claims the benefit of German Patent Application No. 10 2004 037 356.6 filed on Jul. 30, 2004, both of which are hereby incorporated by reference in their entirety.

FIELD OF THE INVENTION

The present invention relates to a wall structure for restricting a hot gas path in a gas turbine or in a combustion chamber, especially of a gas turbine.

BACKGROUND

European patent application EP 1 033477 B1 describes a wall structure in the form of a gas turbine jacket ring made up of a plurality of jacket segments or wall segments that are arranged cylindrically. In each case, two wall segments are arranged adjacent to each other in a connection area. In this connection area, a face of one wall segment is arranged across from a face of the other wall segment. The faces are at a distance from each other and between them, they form a gap leading from an inside of the wall segments facing the hot gas path to an outside of the wall segments facing away from the hot gas path. The faces of the wall segments situated across from each other at the gap each have a receiving groove open towards the gap. The receiving grooves are arranged across from each other with respect to the gap and they serve to receive a sealing element that bridges the gap. For purposes of cooling the wall segments in the connection area, one of the wall segments has a hole that leads from the outside of this wall segment to its inside or to its face. In order to prevent direct exposure of the sealing element to the hot gases, the wall segment on the inside of the prior-art wall structure is fitted with a projection that extends from the face and that protrudes into a recess that has been created on the inside of the face of the other wall segment. Here, the projection has an essentially rectangular cross section, thus creating a baffle with two right-angled deflectors for the gap.

In the described wall structure, the sealing element has a rectangular cross section. For this purpose, the receiving grooves are shaped so as to be complementary, so that for each receiving groove, two opposing groove walls run parallel to each other. In order to attain an efficient sealing effect, the distance between the groove walls is essentially the same as the thickness of the sealing element. Thus, the sealing element is inserted into the receiving grooves with a precise fit.

The production of the wall segments entails tolerances. Moreover, the assembly of the wall structure likewise entails tolerances. In the assembled state, these manufacturing tolerances can give rise to different relative positions between adjacent wall segments. Furthermore, during operation of the gas turbine or of the combustion chamber, thermal expansion effects can likewise lead to changing relative positions for adjacent wall segments. With the described wall structure, however, an actual relative position between adjacent wall segments that differs from the desired target relative position, on the one hand, makes it more difficult to assemble the sealing element and, on the other hand, causes high loads in and/or damage to the sealing element or to the wall segments in the connection area during operation of the gas turbine or of the combustion chamber.

SUMMARY OF THE INVENTION

An object of the present invention is to provide an improved embodiment for a wall structure of the above-mentioned type in which especially the risk of damage due to varying relative positions between adjacent wall segments is reduced.

According to the present invention, some play between the sealing element and the receiving grooves in the direction of the thickness of the sealing element is provided, said play being dimensioned in such a way that tolerance-related changes in the relative position between adjacent wall segments caused by thermal expansion effects can be tolerated without the sealing element being jammed into the receiving grooves. In this context, the invention makes use of the realization that the sealing element does not have to be inserted into the receiving grooves with a precise fit in order to achieve a sufficient sealing effect. It has been shown that a sufficient sealing effect can already be attained if the sealing element lies flat on the surface or linearly along one of the groove walls of each receiving groove. The minimum play for this purpose is attained according to an embodiment of the present invention when the ratio of the distance between the opposing groove walls to the thickness of the sealing element is equal to or greater than 1.1, whereby here the distance of the groove walls is measured at the groove bottom, that is to say, directly before the groove bottom or directly before any transition that might exist between the groove walls and the groove bottom.

In a preferred embodiment, the groove walls can extend parallel to each other. In such an embodiment, the values for the distance-to-thickness ratio preferably lie within the range from 2.5 to 3.5. As a result, relatively large position changes can be tolerated between the wall segments that are coupled to each other by the connection area.

In another embodiment, the receiving grooves can each have a tapered cross section widening towards the groove opening. With such a configuration of the receiving grooves, their walls run to the groove bottom at a slant with respect to each other. Then the values for the distance-to-thickness ratio preferably lie between 1.2 and 1.9. It is preferable for the distance between the groove walls to be measured at the groove bottom. Owing to the funnel like widening of the groove cross section, the sealing element can move without jamming and thus a sufficient sealing effect can be ensured for a relatively large range of different relative positions of the adjacent wall segments.

In the case of a pairing of wall segments in which one wall segment has a projection that protrudes into a recess formed on the other wall segment, the invention proposes that the projection be configured with a tapered cross section so that it tapers towards the gap. This measure also accounts for increased mobility between the adjacent wall segments, concurrently reducing the risk that relative movements between the walls segments might close the gap by causing the projection to come to rest against a wall section of the recess.

Other features and advantages of the wall structure according to the present invention ensue from the claims, from the drawings and from the accompanying description of the figures making reference to the drawings.

BRIEF DESCRIPTION OF THE DRAWINGS

Preferred embodiments of the invention are presented in the drawings and will be explained in greater detail in the description below, whereby the same reference numerals are used for identical, similar or functionally equivalent components. The following is shown schematically.

DETAILED DESCRIPTION

Figure 1:
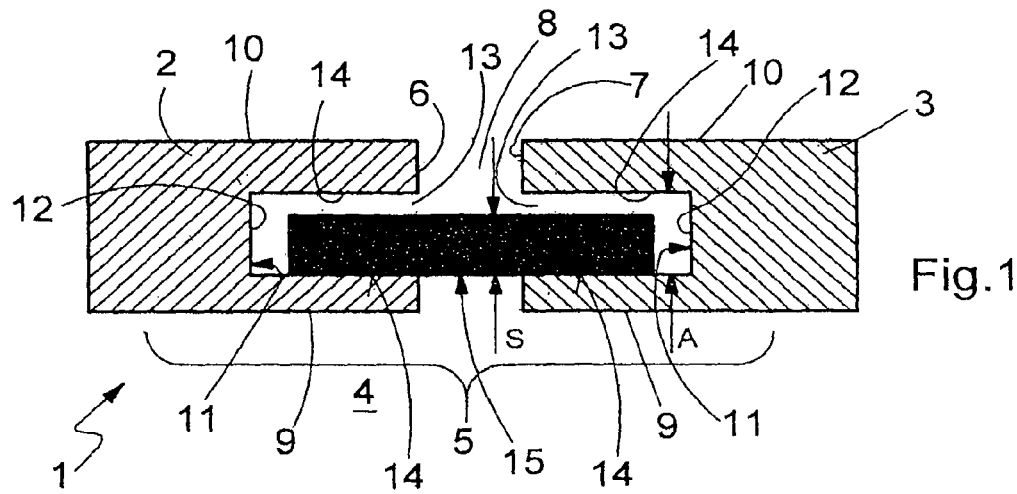
FIG. 1 shows a simplified cross section through a connection area of two adjacent wall segments of a wall structure according to an embodiment of the present invention.

As shown in FIG. 1, a wall structure 1 (of which only a small portion is shown here) has at least two wall segments 2, 3 (of which only a small front edge area is depicted here). Normally, the wall structure 1 includes a plurality of such wall segments 2, 3 and it serves to restrict a hot gas path 4 in a gas turbine (not shown here) or in a combustion chamber (not shown here), especially of a gas turbine. In a practical manner, the wall structure 1 can form a jacket ring of the gas turbine or of the combustion chamber in which the individual wall segments 2, 3 are arranged cylindrically and form jacket segments of the jacket ring.

In this context, FIG. 1 shows a connection area 5 in which two wall segments 2, 3 are arranged adjacent to and facing each other. This connection area 5 is indicated by a horizontal brace. A face 6 of one wall segment 2 and a face 7 of the other wall segment 3 are arranged across from each other in this connection area 5. These two faces 6, 7 are at a distance from each other here, as a result of which they can form a gap 8 between them. This gap 8 leads from an inside 9 of the wall segments 2, 3 facing the hot gas path 4 to an outside 10 of the wall segments 2,3 facing away from the hot gas path 4. Each of the faces 6, 7 contains a receiving groove 11 open towards the gap 8, said receiving grooves 11 each having a groove bottom 12, a groove opening 13 across from the groove bottom 12 as well as two groove walls 14 situated across from each other. The receiving grooves 11 of the two faces 6, 7 are arranged across from each other. In order to seal off the gap 8, a sealing element 15 that bridges the gap 8 is inserted into the receiving grooves 11, for which purpose it engages into both receiving grooves 11. The sealing element 15 is normally band-shaped and is made of metal, preferably having a rectangular cross section. Here, the corners of this rectangular cross section can be rounded off to varying degrees. However, other cross section geometries are fundamentally conceivable for the sealing element 15. For example, the sealing element 15 can have a rhombic cross section.

The sealing element 15 can have, for instance, a thickness S within the range from 0.2 mm to 1.5 mm.

According to an embodiment of the present invention, the sealing element 15 engages with lateral play into the receiving grooves 11. For this purpose, the distance A between the groove walls 14 of the appertaining groove 11 is greater than the thickness S of the sealing element 15. In order to achieve a desired minimum play, the ratio of the distance A to the thickness S is equal to or greater than 1.1. Here, the distance A between the groove walls 14 should be measured at the groove bottom 12, in other words, directly before the groove bottom 12 or directly before any rounded-off transition that might exist between the groove walls 14 and the groove bottom 12. With a groove geometry of the type selected for the embodiment shown in FIG. 1, the distance A can be measured at any desired place between the groove bottom 12 and the groove opening 13 since this is where the groove walls 14 are arranged parallel to each other. In the embodiment shown here, the thickness S of the sealing element 15 can be measured at any desired place since the rectangular cross section of the sealing element 15 has a constant thickness S. If the sealing element 15 used has a thickness S that varies over the width of the sealing element 15, then the thickness S is preferably measured at the lateral end of the sealing element 15 that faces the appertaining groove bottom 12.

Thanks to the play provided according to an embodiment of the present invention, wherein it applies that A/S≥1.1, the adjacent wall segments 2, 3 can have relative positions that differ from each other and for which a sufficient sealing effect can be ensured. The relative positions of adjacent wall segments 2, 3 can vary due to thermal expansion effects. By the same token, manufacturing tolerances can also account for differing relative positions for adjacent wall segments 2, 3.

The sealing effect of the gap sealing thus provided is attained by means of the force with which the sealing element 15 is pressed against the groove walls 14 arranged closer to the hot gas path 4. The effect of this force can be generated, for example, by the pressure exerted by a cooling medium, by centrifugal forces, by spring forces or the like.

For the embodiment shown in FIG. 1, where the groove walls 14 situated across from each other extend parallel to each other within the appertaining receiving groove 11, values within the range from 2.5 to 3.5 are preferred for the ratio of the distance A to the thickness S. By coordinating the dimensions of the receiving grooves 11 and the sealing element 15, normal manufacturing tolerances and normal thermal expansions can be tolerated without damage by the gap sealing created in the connection area 15.

Figure 2:
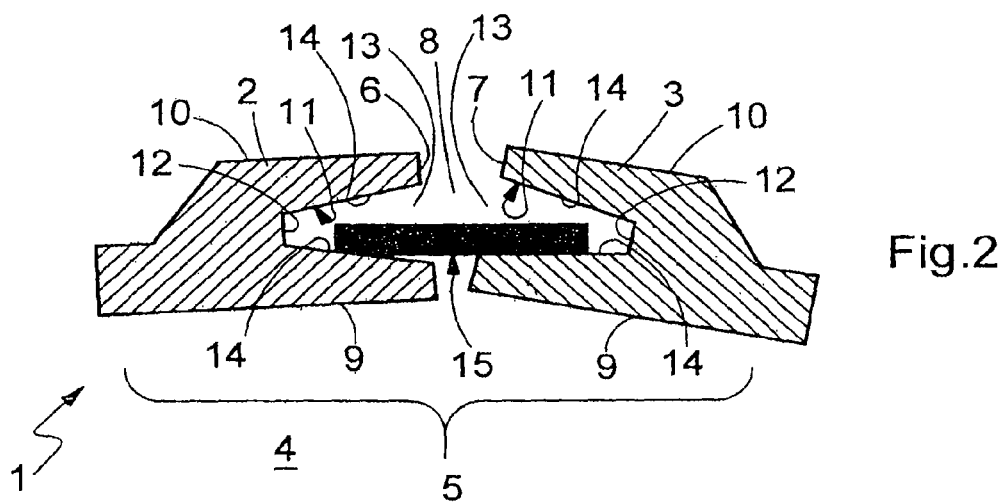
FIG. 2 shows a view as in FIG. 1, but for a different embodiment according to the present invention.

In the embodiment shown in FIG. 2, the groove walls 14 run at a slant with respect to each other, namely, from the groove opening 13 to the groove bottom 12. This results in a tapered cross section for the appertaining receiving groove 11, said cross section widening towards the groove opening 13. By means of such a tapered groove cross section, changes in the relative positions between adjacent wall segments 2, 3 can be tolerated by the sealing element 15. FIG. 2 shows an exaggerated view of an extreme relative position in which a sufficient sealing effect can nevertheless still be attained.

Figure 3:
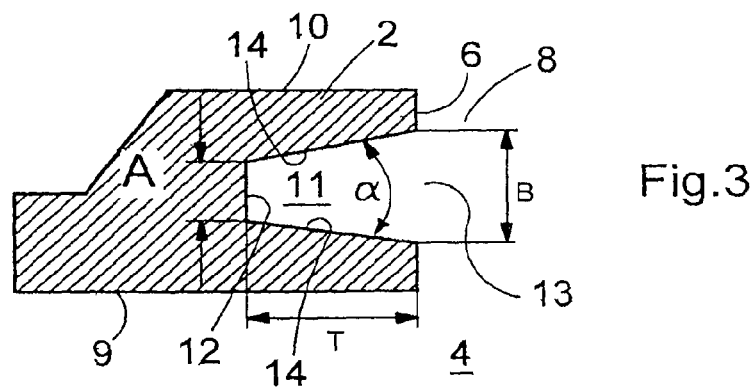
FIG. 3 shows an enlarged detailed view of the connection area for one of the wall segments from FIG. 2.

For the embodiment of FIGS. 2 and 3, in which the receiving grooves 11 each have a tapered cross section, values within the range from 1.2 to 1.9 are preferred for the ratio of the distance A to the thickness S. In the case of a tapered groove cross section, the decisive factor is for the distance A to be measured directly at the groove bottom 12, as indicated in FIG. 3. Furthermore, the dimensioning of the groove geometry is advantageously such that the ratio of the opening width B measured at the groove opening 13 to the distance A has values that lie within the range from 1.2 to 4. In addition to or as an alternative to this, the ratio of the groove depth T to the thickness S of the sealing element 15 can be selected in such a way that it has values that lie within the range from 10 to 35. As a result of the dimensions of the distance A, the opening width B and the groove depth T, a taper angle α at which the groove walls 14 are slanted with respect to each other can be ascertained.

Figure 4:
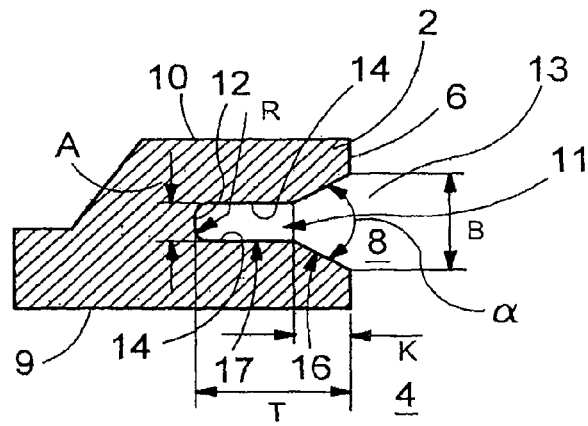
FIG. 4 shows a view as in FIG. 3, but for a different embodiment according to the present invention.

FIG. 4 shows another embodiment of a groove geometry according to an embodiment of the present invention. The receiving groove 11 here has a tapered cross section segment 16 followed by a constant cross section segment 17. The two cross section segments 16, 17 make a direct transition into each other. Whereas the tapered cross section segment 16 extends towards the groove opening 13, widening in the process, the constant cross section segment 17 extends to the groove bottom 12 and is characterized in that the groove walls 14 run parallel to each other in the groove bottom. Here, too, a variant is preferred in which the ratio of the distance A of the groove walls 14 to the thickness S of the sealing element 15 has values that lie within the range from 1.2 to 1.9. Moreover, it can also be advantageous here to select the ratio of the opening width B to the distance A in such a way that values are obtained that lie within the range from 1.2 to 4. Besides, the ratio of the total groove depth T to the thickness S can also lie within the range from 10 to 35 here. When it comes to dimensioning the tapered cross section segment 16, preference is given to an embodiment in which the ratio of the depth K of the tapered cross section segment 16 to the total groove depth T has values that lie within the range from 0.1 to 0.8. Here, too, a taper angle α can be ascertained from the cited ratios or from the cited dimensions for the distance A, the groove depth T, the opening width B and the depth K of the tapered cross section segment 16.

Moreover, in the embodiment shown in FIG. 4, the groove bottom 12 is rounded off or rounded. This rounding can be made, for instance, with a radius R, whereby values within the range from 0.1 to 0.5 for the ratio of the radius R to the distance A have proven their worth. Although in the other embodiments shown here, the groove bottom 12 is not depicted as being rounded-off, it is clear that a rounded-off groove bottom 12 can also be advantageous for all of the embodiments, whereby the above-mentioned calculation procedure for the radius R can also be employed for the other embodiments.

Figure 5:
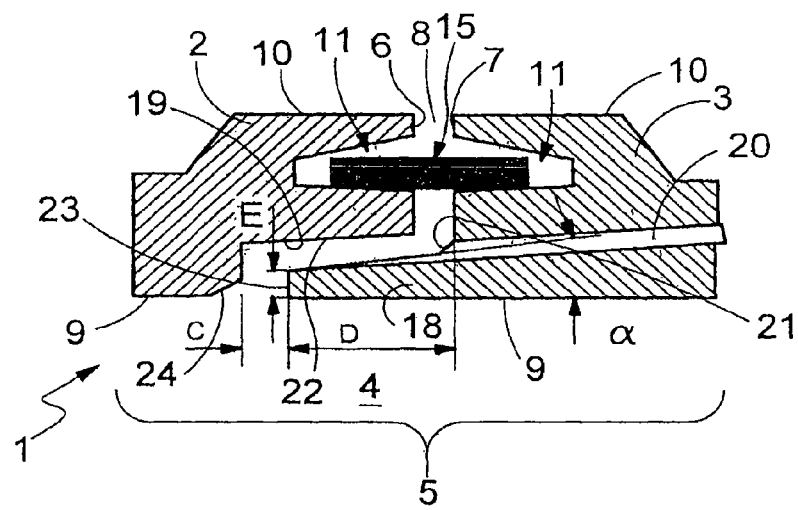
FIG. 5 shows a view as in FIG. 2, but for a different embodiment according to the present invention.
Figure 6:
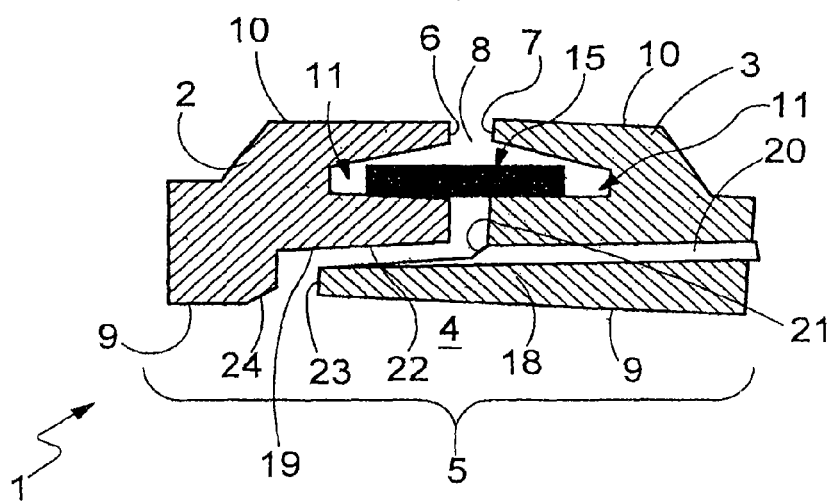
FIG. 6 shows a view as in FIG. 5, but for another relative position between the wall segments.

In the embodiment shown in FIGS. 5 and 6, the wall segment 3 shown here on the right is configured on its inside 9 with a projection 18 that extends from the face 7 of this wall segment 3. Virtually complementary to this, the other wall segment 2 shown here on the left is provided on its inside 9 with a recess 19 that has been created on the inside 6 of this wall segment 2. Here, the projection 18 and the recess 19 are coordinated with each other in such a manner that the projection 18 protrudes into the recess 19 so that the gap 8 acquires a special geometry. The interaction of the projection 18 and the recess 19 protects the sealing element 15 against direct exposure to hot gases coming from the hot gas path 4. Fundamentally, any of the above-mentioned embodiments can be fitted with such a projection-recess combination 18, 19.

The embodiment shown in FIGS. 5 and 6 is also fitted with at least one cooling channel 20 that transports a cooling medium from an inlet (not shown here) to an outlet 21 that opens up into the gap 8 here. The cooling channel 20 runs through one wall segment 3 towards its face 7. Fundamentally, it is likewise possible for the cooling channel 20 not to end up in the gap 8 but rather on the inside 9 of the appertaining wall segment 3. Furthermore, in addition to or as an alternative to this, the other wall segment 2 can also be equipped with at least one such cooling channel 20.

A cooling channel 20 can also be realized in another, above-mentioned embodiment in a corresponding manner.

It is preferable that this projection 18 to be configured with a tapered cross section so that the projection 18 tapers towards the gap 8. Because of this taper of the projection 18, the adjacent wall segments 2, 3 can execute movements relative to each other without this causing contact to be made between the projection 18 and a wall 22 of the recess 19 facing the projection 18. In other words, the gap 8 always remains open to an extent that is sufficient to prevent harmful contact of the wall segments 2, 3 that are coupled to each other in the connection area 5 and so as to avoid blockage of the cooling channel 20.

Values that lie within the range from 1.5 to 6 at the free end 23 of the projection have proven their worth for the ratio of the length D of the projection 18 to the end thickness E of the projection 18. In this context, the length D of the projection 18 is the dimension with which the projection 18 extends from the other face 7 of the appertaining wall segment 3. The free end 23 of the projection 18 lies at the gap 8.

In addition to or as an alternative to this, the ratio of the gap width C between the projection 18 and the recess 19 to the cited end thickness E of the projection 18 can be selected in such a way that it has values that lie within the range from 1.0 to 5. It can be seen in FIGS. 5 and 6 that the gap width C is measured without taking into account any flat area 24 that might be present at the transition between the gap 8 and the inside 9 of the appertaining wall segment 2.

A taper angle α of the projection 18 can advantageously have values within the range from 2° to 60°. Preference is given to values between 5° and 15°.

In the embodiment shown in FIGS. 5 and 6, the receiving grooves 11 are shaped like the ones in the embodiment of FIGS. 2 and 3. The dimensions of the sealing element 15 are coordinated in a corresponding manner. Naturally, the variants shown in FIG. 1 or FIG. 4 can also be employed instead of this sealing variant.

The present invention is not limited to the embodiments described herein; reference should be had to the appended claims.

What is claimed is:

1. A wall structure for restricting a hot-gas path in a gas turbine or in a combustion chamber, the wall structure comprising:
    a first wall segment having a first face;
    a second wall segment having a second face, each of the first and second wall segments disposed adjacent to each other in a connection area so as to define an inside of the wall segments facing the hot-gas path and an outside of the wall segments facing away from the hot-gas path, the first and second faces being disposed across from each other at a distance so as to form a gap leading from the inside to the outside, wherein each of the first and second faces has a receiving groove having an opening toward the gap; and
    a sealing element having a length and a thickness, the sealing element being disposed in the receiving grooves such that the length of the sealing element bridges the gap,
    wherein the first face has a recess on the inside of the first wall segment and wherein the second wall segment has a projection on the inside of the second wall segment that extends from the second face, into the recess in the first face and to a free end of the projection, and
    wherein the projection is tapered along the gap from the second face to the free end so as to allow a relative movement of the projection toward a wall of the recess in a direction of the thickness of the sealing element without the projection making contact with the wall of the recess, and wherein the first face and the second face are each arranged substantially orthogonal to the inside of the wall segments facing the hot-gas path.

2. The wall structure as recited in claim 1, wherein a ratio of a distance between opposing groove walls of the receiving grooves to the thickness of the sealing element is equal to or greater than 1.1.

3. The wall structure as recited in claim 1, wherein the projection has a projection length from the second face to the free end and an end thickness of the free end, and wherein a ratio of the projection length to the end thickness lies within a range from 1.5 to 6.

4. The wall structure as recited in claim 1, wherein the gap has a gap width between the projection and the recess, wherein the free end of the projection disposed at the gap has an end thickness, and wherein a ratio of the gap width to the end thickness lies within a range from 1.0 to 5.

5. The wall structure as recited in claim 1, wherein a taper angle of the projection lies within a range from 2° to 60°.

6. The wall structure as recited in claim 5, wherein the taper angle of the projection lies within a range from 5° to 15°.

7. The wall structure as recited in claim 1, further comprising a cooling channel disposed above the projection and having an outlet at the gap, the cooling channel extending in a direction of the projection from the second face to the free end so that cooling fluid is introduced into the gap, by the cooling channel, in the direction of the projection.

8. A wall structure for restricting a hot-gas path in a gas turbine or in a combustion chamber, the wall structure comprising:
  a first wall segment having a first face;
  a second wall segment having a second face, each of the first and second wall segments disposed adjacent to each other in a connection area so as to define an inside of the wall segments facing the hot-gas path and an outside of the wall segments facing away from the hot-gas path, the first and second faces being disposed across from each other at a distance so as to form a gap leading from the inside to the outside, wherein each of the first and second faces has a receiving groove having an opening toward the gap; and
  a sealing element having a length and a thickness, the sealing element being disposed in the receiving grooves such that the length of the sealing element bridges the gap,
  wherein the first face has a recess on the inside of the first wall segment and wherein the second wall segment has a projection on the inside of the second wall segment with a length that extends from the second face, into the recess in the first face and to a free end of the projection having an end thickness at the gap, a first ratio of the length of the projection to the end thickness lies within a range from 1.5 to 6 and a second ratio of a width of the gap between the projection and the recess to the end thickness lies within a range from 1.0 to 5 and
  wherein the projection is tapered along the gap from the second face to the free end so as to allow a relative movement of the projection toward a wall of the recess in a direction of the thickness of the sealing element without the projection making contact with the wall of the recess, and wherein the first face and the second face are each arranged substantially orthogonal to the inside of the wall segments facing the hot-gas path.

* * * * *